S. D. PURDY.
BALE TYING ATTACHMENT FOR BALING PRESSES.

No. 180,788. Patented Aug. 8, 1876.

Witnesses
B. S. DeForest
Jas. Mahon

Inventor
S. D. Purdy
By Geo. W. Tibbitts, Attorneys

UNITED STATES PATENT OFFICE.

STACY D. PURDY, OF CLEVELAND, OHIO, ASSIGNOR OF ONE-HALF HIS RIGHT TO H. S. ADAMS & CO., OF SAME PLACE.

IMPROVEMENT IN BALE-TYING ATTACHMENTS FOR BALING-PRESSES.

Specification forming part of Letters Patent No. 180,788, dated August 8, 1876; application filed May 17, 1876.

*To all whom it may concern:*

Be it known that I, STACY D. PURDY, of Cleveland, in the county of Cuyahoga and State of Ohio, have invented a new Bale-Tying Attachment for Baling-Presses, of which the following is a specification:

This invention relates to a device to be attached to the side of a baling-press, for the purpose of tying the ends of the wires that bind the bales, this being an accompaniment to my bale-tie patented April 11, 1876.

It consists of a short hollow or grooved shaft, journaled in a frame to be attached to the side of the press, by beveled gear to a counter-shaft, having a hand-crank for operating it. The ends of the wires which surround the bale are lapped together in the groove through the shaft, its gear, and the frame, and are given a few turns by the crank, which twists the wires together, locking or tying them, as shown in my patent tie above mentioned.

Figure 1:
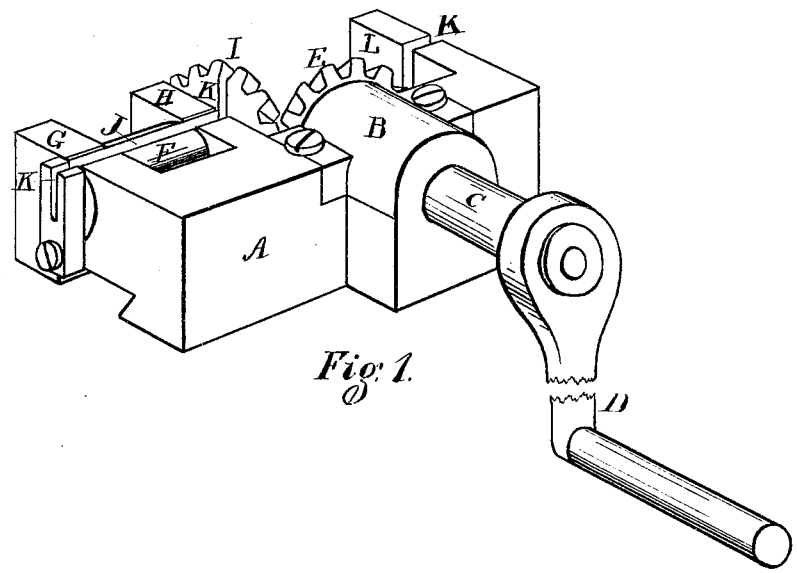
Figure 2:
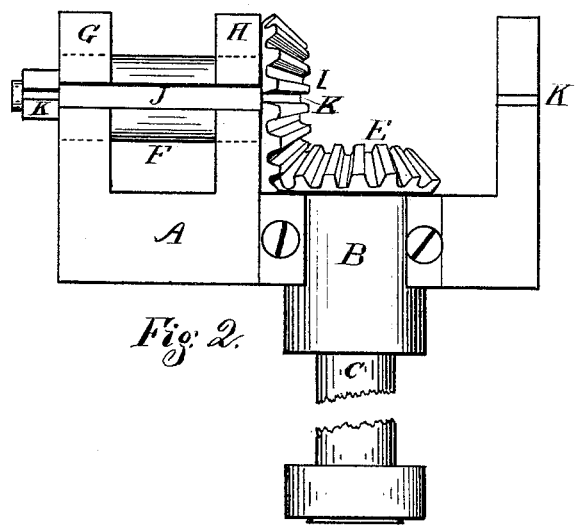

In the accompanying drawing, Figure 1 is a perspective view. Fig. 2 is a top or plan view of the above-mentioned device.

A represents a frame, having a journal-box, B, in the side, in which a shaft, C, is made to revolve by a crank, D, said shaft carrying a bevel-gear wheel, E. F is a counter-shaft, having its bearings in the arms G H of the frame A, and is provided with a bevel-gear wheel, I, which meshes with and is turned by the wheel E on shaft C. The shaft F has a deep groove, J, throughout its length, and the gear E has a narrow slot, K, connected with said groove J. On the side of the arm G is attached a button, having a narrow slot also in line with aforesaid groove, as also has the arm L at the opposite end of the frame.

This device is attached to a bar on the side of the press, it having a dovetail groove in its bottom for that purpose, and by which it may be adjusted to position at the side of the bale. The ends of the wire, being passed around the bale, are lapped and laid together in slots and groove above described. The slots, being narrow, hold or gripe the wires, and, by giving the shaft F a few revolutions, the wires are twisted firmly together and locked.

One of these devices for each of the three wire binders of the bale is attached to the press.

Having described my invention, I claim—

The above-described device, consisting of the frame A, having arms G H L, the shaft F, having the groove J, connected with the slots K and the bevel-gears E I, the shaft C, and crank D, all constructed, combined, and operating substantially as and for the purpose specified.

S. D. PURDY.

Witnesses:
   GEO. W. TIBBITTS,
   F. W. CADWELL.